April 29, 1952 — F. A. GERMANN — 2,594,910
ROLL-UP TYPE VEHICLE TOP COVER
Filed Dec. 21, 1948
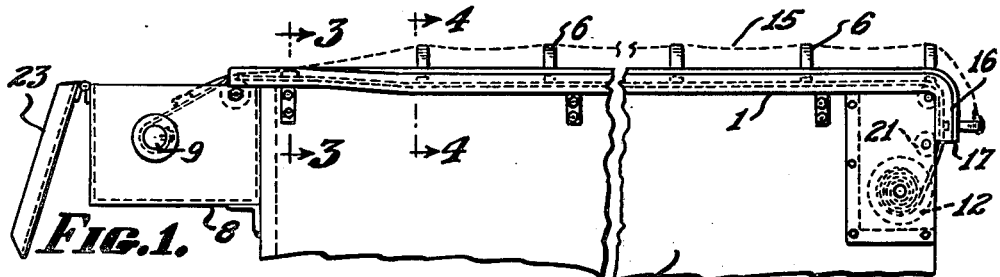
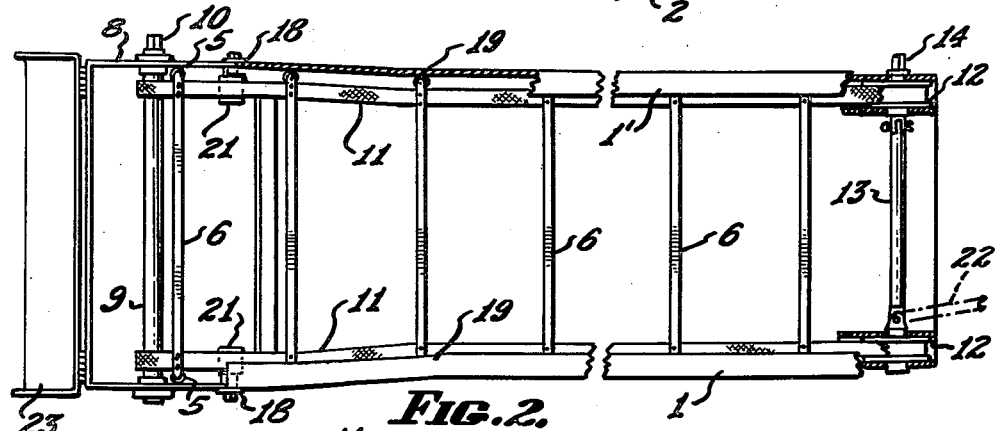
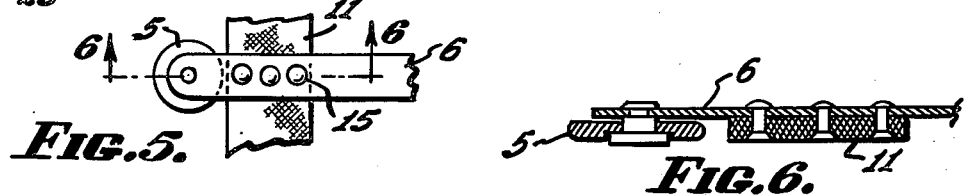
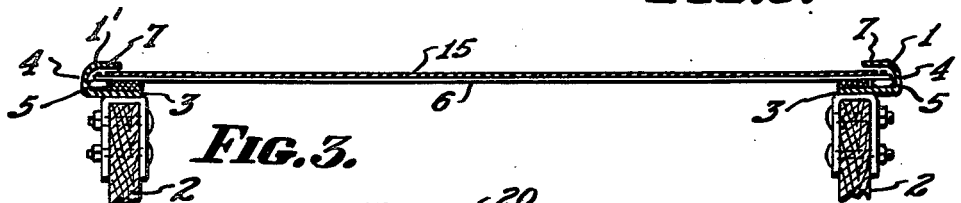
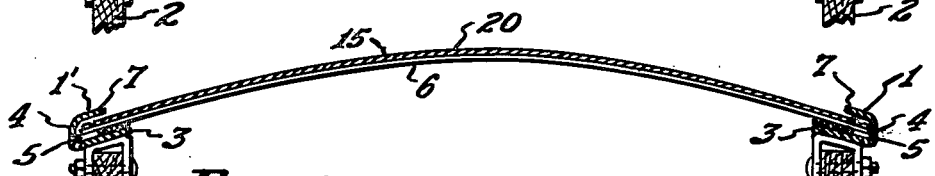
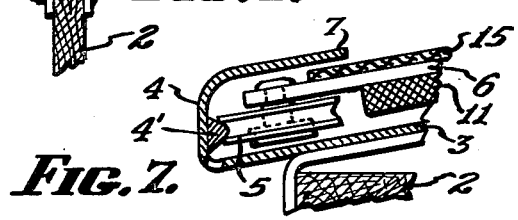
INVENTOR.
FRANK A. GERMANN,
BY Allen & Allen
ATTORNEYS.

Patented Apr. 29, 1952

2,594,910

UNITED STATES PATENT OFFICE 2,594,910

ROLL-UP TYPE VEHICLE TOP COVER

Frank A. Germann, Ripley, Ohio

Application December 21, 1948, Serial No. 66,447

4 Claims. (Cl. 296—98)

My invention relates to a truck or trailer canopy for covering the top of opened top trucks.

In the transportation industry it is expeditious in numerous instances to load trailers or trucks from the top instead of the rear. For this purpose, a great many trucks or trailers are made with side walls but without any top or roof. This permits the loading to be done by a crane or the like and the load is protected from the weather during transportation by a tarpaulin tied in position over the top opening. Unless this tarpaulin is securely fastened, it is apt to pick up air while the truck is in motion, which in turn tends to tear the tarpaulin off the truck. Another difficulty is that rain or snow is very apt to collect on the top of a tarpaulin tending to tear the same, besides adding weight and hence an extra load to the truck. Tarpaulins of the type described above are very difficult to remove if they become wet and freeze.

It is an object of my invention to provide a canopy for a truck or trailer which is normally carried by the truck itself whether in use or not. When it is desirable to place the canopy in position, it is merely necessary to actuate certain mechanism which will pull the canopy over the top of the truck and wherein the removal of the canopy involves substantially the same procedure.

It is a further object of my invention to provide a truck canopy which is so supported underneath that the canopy when in position is crowned and thus permits rain, snow, or the like to roll off the canopy and not collect in ever enlarging puddles.

A further object of my invention is to provide a canopy which when in position on the top of a truck is completely sealed against the side walls of the truck as well as the front portion of the truck, thus preventing the entrance of air or wind with its tendency to blow off the canopy.

In the following description and in the drawings, I will describe my novel canopy as applied to the open top of a trailer. However, it is to be understood that my canopy may be used on other types of vehicles having an open top such as trucks, railroad cars, etc.

These and other objects of my invention which will be set forth hereinafter or will be apparent to one skilled in the art upon reading these specifications, I accomplish by that certain construction and arrangement of parts of which I shall now describe an exemplary embodiment.

Reference is now made to the drawings which form a part hereof and in which:

Figure 1 is a side elevation of the upper portion of a trailer with my novel canopy in place, the tarpaulin itself being shown in broken lines.

Figure 2 is a plan view of my novel canopy in position on the top of a trailer with the tarpaulin removed to show the underlying ribs.

Figure 3 is a cross section taken on the section line 3—3 of Figure 1.

Figure 4 is a cross section taken on the section line 4—4 of Figure 1.

Figure 5 is a plan view of one of the ends of my ribs.

Figure 6 is a cross section taken on the section line 6—6 of Figure 5.

Figure 7 is an enlarged cross section similar to the end of the cross section in Figure 4 showing a modified form of reel.

Briefly, in the practice of my invention, I provide a set of tracks which run along the top edge of the side walls of the trailer. Riding on the tracks are resilient strips or ribs with rollers adjacent their ends which directly ride in the tracks. The two tracks approach each other and become parallel with a spaced distance less than the length of the ribs. This insures the bowing of the ribs when they reach this section of the track.

A tarpaulin or other weather impervious material is mounted on and fastened to the ribs and when the canopy is not in use the ribs and the covering is rolled on a roller in the front part of the trailer.

The ribs themselves are spaced apart and fastened together by parallel straps, the ends of which extend from the roll which carries the canopy through the tracks and onto take up sheaves at the rear end of the trailer. These sheaves are keyed to a shaft so that when the shaft is revolved, the straps will be pulled through the track, thus unrolling the canopy from its roll at the forward end of the trailer and pulling the ribs into the tracks while the ribs are flat upon the roll. When they are pulled through the parallel narrow portion of the tracks they become bowed and thus the material on the ribs forms a crowned roof over the trailer. I preferably slant the tracks at the section where they are parallel in such a way as to insure that the ribs bow upwardly to form the crown instead of downwardly.

When it is desirable to remove the canopy, the canopy-carrying roller is revolved and the ribs pulled back onto the roller in their flattened condition together with the canvas leaving merely the ends of the straps in the tracks and the top of the trailer uncovered.

Referring to the drawings, I provide tracks 1 and 1' attached to the top edge of the side panels 2 of a truck or trailer. In the embodiment shown, the tracks 1 consist of a channel with the leg 3 fastened to the upper edge of the side wall 2 shown in Figure 3. The web 4 of the channel 1 acts as an abutment for rollers 5 rotatably mounted on the ribs 6. The other leg 7 of the channel overhangs the lower leg 3 and prevents snow and the like from getting within the channel and blocking the track.

In a box 8 at the front of the trailer I mount a roller 9 which may be turned by applying a crank to the squared end 10. Straps 11 are attached to the roller 9 and run through the tracks 1 to take-up spools or sheaves 12 at the rear of the trailer. These take-up sheaves 12 are keyed to a common shaft 13 which may be revolved by means of a crank engaging the squared end 14.

Appropriately spaced along the straps 11 I mount the ribs 6 fastening them through the straps 11 with rivets or the like 15. The ends of the ribs 6, as stated above, have rollers 5 mounted thereon which ride in the tracks 1 as shown in Figures 3 and 4. The tarpaulin or canvas cover 15 is attached to the ribs 6 as shown by the broken lines in Figure 1.

The ends 16 of the tracks 1 are bent downwardly on a radius at the rear of the truck and terminate as at 17 just above the sheaves 12.

The straps 11 are at least twice as long as the length of the trailer body and the excess of the strap 11 is always rolled either on the sheaves 12 or the roller 9.

The ribs 6 are mounted on the forward ends of the straps 11 so that when this portion of the straps 11 are rolled on the roller 9, all of the ribs 6 are also on the roller 9, as is the tarpaulin or covering which is attached to them. In this position, the top of the trailer is open for loading.

When it is desirable to cover the top of the trailer, the shaft 13 is revolved to take up on the straps 11. As the straps 11 move towards the rear of the trailer the ribs 6 are pulled off the roll 9 and through the tracks 1, thus carrying up the tarpaulin or covering with them and progressively covering the top of the trailer from front to rear.

The tracks 1 at their forward ends 18 are spaced apart at least a distance equal the length of the ribs 6. However, as they approach the rear, they gradually approach each other and become parallel as at 19, spaced apart a distance less than the length of the ribs 6. Inasmuch as the ribs 6 abut the web portion 4 of the track 1 with the rollers 5, this narrowing of the track spacing forces the ribs 6 to bow. As the tracks 1 approach each other, they are progressively tilted as shown in Figure 4 so that the bowing is forced upwardly, thus resulting in a crown 20 as shown in Figure 4. This bowing action resulting in the crown, continues all the way to the end 17 of the tracks 1. At this point, I may provide a stop or I may prevent the bows 6 from riding out the end of the track 17 by means of limiting the unrolling of the straps 11 from the roller 9. I also provide idler rollers 21 at the terminals of the tracks 1 so as to facilitate the movement of the straps 11.

In the embodiment shown, I have made the shaft 13 in such a manner that it may be broken and opened as shown by the dotted lines 22 in Figure 2. This permits loading of the trailer at that point. I also preferably provide a top 23 for the roll carrying box 8. As shown in Figure 1, the top 23 is so proportioned as to permit the straps 11 as well as the ribs 6 and canopy 15 to feed on or off the roll 9 without the necessity of opening the lid 23. From the above, it is apparent that I have provided a canopy for a trailer which may form a part of the trailer and which may be rolled up on the roll at the front when not in use and during loading, thus making the whole top of the trailer available, but which may be easily and quickly rolled onto the top of a trailer to provide a weather-proof covering for the load. It is also apparent that there are no apertures between the canopy and the body of the trailer which would permit the weather or wind to get under the canopy and blow off the same, nor is there the likelihood of depressing the top of the canopy when in position so as to form pools for the reception of water or snow. My canopy may be unrolled in place or removed from the top of a trailer by one operator under the most adverse weather and wind conditions and the life of the tarpaulin or covering is greatly extended over the normal type in present use, since wrinkling and pinching is eliminated.

In the modification shown in Figure 7, I provide a track 4' on the inner surface of the web 4 and provide a peripheral groove in the roller 5 so that the roller 5 will ride on and straddle the track 4' and thus prevent any possibility of binding.

It is to be understood that modifications may be made in my invention without departing from the spirit thereof and I do not intend to limit myself otherwise than as pointed out in the claims which follow.

Having thus described my invention, what I claim as new and desire to secure by Letters Patent is:

1. In the combination of an open top trailer and a cover for the same, a canopy consisting of weather-proof material mounted on resilient ribs, rollers mounted on the ribs adjacent their ends and riding in parallel tracks mounted on the upper edges of the side walls of the trailer, said resilient ribs being longer than the space between the tracks so that the resilient ribs bow upwardly to form a crown, and a spool at the forward end of the trailer adapted to receive and hold the canopy and unbowed ribs when it is not in use, the resilient ribs being spaced apart and held parallel to each other by straps running through the track to which the ends of the ribs are attached, said straps continuing the length of the trailer with their ends attached to winding sheaves mounted on a rotatable shaft for drawing the straps and the canopy off the spool and onto the tracks, the forward ends of said tracks spreading apart from each other a distance equal to the length of the resilient ribs.

2. In the combination of an open top trailer and a cover for the same, a canopy consisting of weather-proof material mounted on resilient ribs, rollers mounted on the ribs adjacent their ends and riding in parallel tracks mounted on the upper edges of the side walls of the trailer, said resilient ribs being longer than the space between the tracks so that the resilient ribs bow upwardly to form a crown, said tracks being in the form of channels facing each other with one leg attached to the edge of the trailer wall and the other leg substantially parallel thereto, the rollers of the resilient ribs interposed between the legs and bearing against the web of the channel, the parallel portions of said track being tilted upwardly so as to assure the upward bowing of said resilient ribs.

3. In the combination of an open top trailer and a cover for the same, a canopy consisting of waterproof material mounted on resilient ribs, the ends of said ribs riding on parallel tracks mounted on the upper edges of the side walls of the trailer, said resilient ribs being longer than the space between the tracks so that they bow upwardly to form a crown, and a spool at the forward end of the trailer adapted to receive the canopy and unbowed ribs when it is not in use, the resilient ribs being spaced apart and held parallel to each other by straps running through the track in which the ends of the ribs ride, said straps continuing the length of the trailer with their ends attached to winding sheaves mounted on a rotatable shaft for drawing the straps and the canopy off the spool and onto the tracks, the forward end of said tracks spreading apart from each other a distance equal to the length of the resilient ribs.

4. In the combination of an open top trailer and a cover for the same, a canopy consisting of waterproof material mounted on resilient ribs, the ends of said ribs riding on parallel tracks mounted on the upper edges of the side walls of the trailer, said resilient ribs being longer than the space between the tracks so that they bow upwardly to form a crown, and a spool at the forward end of the trailer adapted to receive the canopy and unbowed ribs when it is not in use, the resilient ribs being spaced apart and held parallel to each other by straps running through the track in which the ends of the ribs ride, said straps continuing the length of the trailer with their ends attached to winding sheaves mounted on a rotatable shaft for drawing the straps and the canopy off the spool and onto the tracks, the forward end of said tracks spreading apart from each other a distance equal to the length of the resilient ribs, the parallel portions of said track being tilted upwardly so as to assure the upward bowing of said resilient ribs.

FRANK A. GERMANN.

REFERENCES CITED

The following references are of record in the file of this patent:

UNITED STATES PATENTS

| Number | Name | Date |
| --- | --- | --- |
| 1,280,272 | Montroy | Oct. 1, 1918 |
| 2,406,737 | Bramble | Sept. 3, 1946 |
| 2,469,953 | Fowler | May 10, 1949 |

FOREIGN PATENTS

| Number | Country | Date |
| --- | --- | --- |
| 128,456 | Switzerland | May 25, 1932 |
| 278,862 | Great Britain | Oct. 20, 1927 |
| 366,539 | Great Britain | Feb. 5, 1932 |